3,309,757
BORING BARS
Ignatius Konwal, 335 Parkview Ave.,
Elmhurst, Ill. 60126
Filed Apr. 1, 1966, Ser. No. 539,508
2 Claims. (Cl. 29—96)

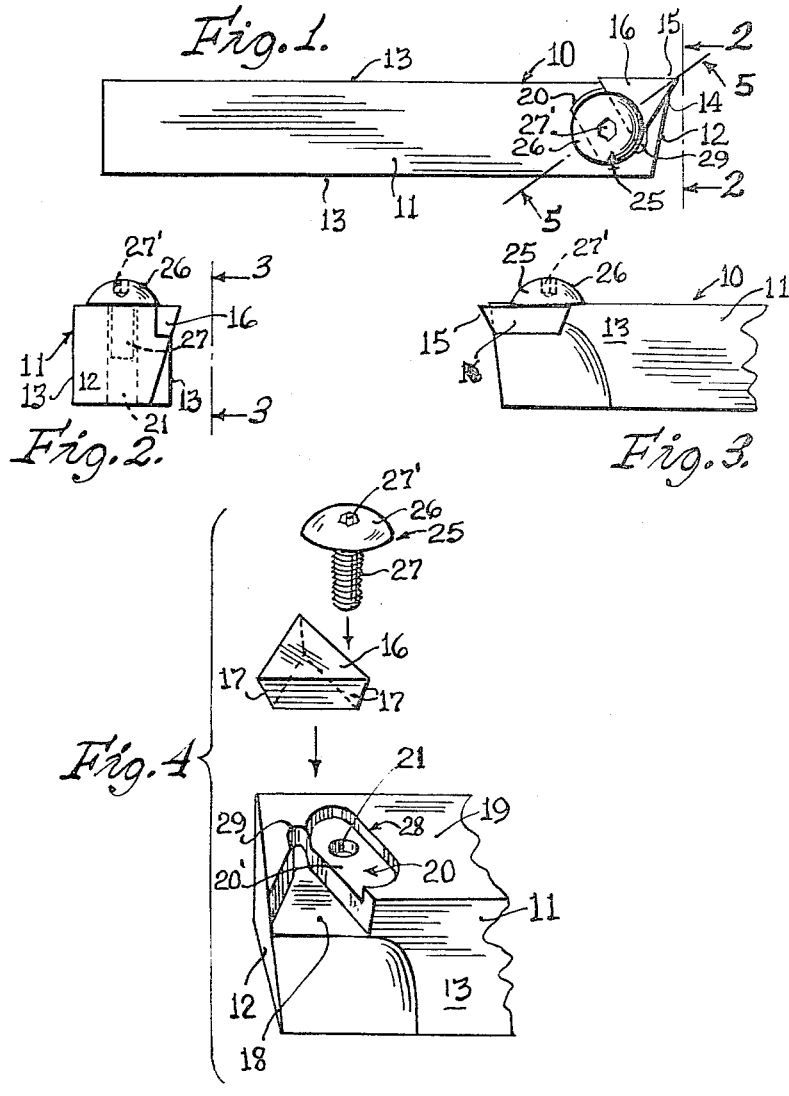

This application is a continuation-in-part of my copending application, Ser. No. 420,597, filed Dec. 23, 1964, entitled, "Boring Bars."

The invention described and claimed in this application relates to certain new and useful improvements in boring bars.

More particularly, the invention is characterized by a simple and novel arrangement for replaceably holding the bit of the tool in position upon the bar member of the tool holder.

Among the salient objects of the invention is to provide a bit holder which is of a compact structure usable in tools of various sizes and particularly adaptable for relatively small tools, the arrangement permitting the use of the invention in small areas as a boring bar. When changing or indexing the tool bit, there are no loose parts which might become lost.

Another object of the invention is the feature of utilizing a clamping screw for firmly holding the bit in its cavity and wherein the resiliency or distortion capabilities of the threaded shank of such screw are utilized to dispose the head of the screw in clamping engagement with respect to the bit.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a plan view of the tool embodying my invention;

FIG. 2 is an end view taken substantially on line 2—2 of FIG. 1;

FIG. 3 is a fragmentary side elevational view taken substantially on line 3—3 of FIG. 2;

FIG. 4 is an enlarged fragmentary perspective view of the parts of my improved holder, showing the same in exploded relation with respect to each other;

FIG. 5 is a sectional detail view taken substantially on line 5—5 of FIG. 1.

The tool holder embodying my invention may be made in various sizes. One illustrative form is shown in the drawings. In this connection, the tool holder is designated generally at 10. It comprises a bar member 11 having, in the form shown in the drawings, an end surface 12 which is oblique to the side surfaces 13 at the top of the bar, to provide a lead tip 14 from which projects the cutting tip 15 of a bit 16.

In the form shown in the drawings, the bit 16 is substantially triangular in plan view and comprises side walls 17 which slightly taper downwardly and inwardly as will be apparent from FIGS. 3 and 4.

A cavity 18 is formed in the bar 11 to receive the bit 16. The side walls of the cavity 18 are of substantially the same taper as that of the bit 16 whereby a snug fit is accomplished when the bit 16 is inserted in the cavity 18.

To one side of the cavity 18 there is formed in the top wall 19 of the bar 11 an elongated counterbore 20. Centrally within the area of the counterbore 20 there is formed in the bar 11 an opening 21 of two diameters in the direction of its length, the larger diameter 22 being slightly larger than the smaller diameter 23. The latter, unlike the larger diameter, is tapped to provide screw threads.

A clamping screw 25 is provided and includes a head 26 and a shank 27, the head having a tool-receiving socket 27' formed therein. The shank 27 is threaded for threaded engagement into the thread-bearing portion 23 of the opening 21. It will be particularly noted (see FIG. 5) that the larger diameter 22 of the opening 21 is not tapped and does not have contact with the threaded shank 27 for reasons hereinafter stated.

The head 26 of the clamping screw is of a diameter whereby to contact that area indicated at 28, of the bar 11, which is at one side of the counterbore 20 (FIG. 4). By this arrangement, the head 26 is otherwise slightly within the area of counterbore 20.

The bit 16 is assembled in the holder in the following manner:

The bit 16 is placed in the cavity 18 with its tapered sides in contact with the tapered sides of the cavity 18. When the bit is thus placed in the cavity, the top surface 16' of the bit will be slightly above the bottom 20' of the counterbore 20, while the surface 19 will be slightly above the surface 16' of the bit 16. This arrangement is best shown in FIG. 5.

The clamping screw is now threaded into the threaded portion of the opening 21. When partially threaded into the opening 21, the head 26 will first contact the area 28 of the surface 19 of the bar 11. To provide an effective clamp between the head and the bit, further threading of the clamping screw 25 will cause the shank 27 within the unthreaded portion 22 of the opening 21 to bend due to its limited resiliency, thus causing the head 26 to be tilted with respect to the long axis of the shank, with the result that the under surface of the head 26 will bear not only upon the area 28, but also upon the surface 16' of the bit, thus securely clamping the bit 16 in the cavity 18. It requires but a slight bend in the shank 27 to effectively accomplish the clamping of the bit 16 in the cavity.

By this arrangement, I have provided a substantially simple arrangement for effectively clamping a bit in the cavity of a tool holder. Furthermore, the arrangement provides a ready means for removing the bit. This is accomplished by rotating the clamping screw in unthreading direction a sufficient distance to permit the bit to be lifted from its cavity. For this purpose a relatively small recess 29 is provided for the reception of the tip of a suitable tool to lift the bit from the cavity as occasion requires.

From the foregoing description it will be apparent that the objects of my invention have been accomplished by an arrangement highly efficient in use and economical in manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination, a tool holder comprising
   (a) a bar having at one end portion a bit-receiving cavity,
   (b) a bit mounted in said cavity,
   (c) an elongated counterbore formed in said bar at one side of and opening into said cavity,
   (d) the top surface of said bit when mounted in said cavity being in a plane above the bottom surface of said counterbore and below the top surface of said bar, (e) said bar having an opening formed therein centrally with respect to said counterbore,
(f) a clamping screw having an enlarged head and a resilient shank threaded into said opening,
(g) said head being of a diameter less than the elongated length and greater than the width of said counterbore so as to span the width of said counterbore when initially threaded into said opening formed in said bar, said head having a portion bearing upon the top surface of said bar and an equal portion clampingly bearing upon the top surface of said bit when said clamping screw is further threaded into said opening with its resilient shank biased to cant said head into clamping engagement with said top surface of said bit below the plain of the top surface of said bar.

2. The tool holder defined in claim 1 in which the opening provides different diameters in the direction of its length with its upper portion larger in diameter than the threaded shank of said clamping screw and the lower portion threaded to receive the threaded shank of said clamping screw.

References Cited by the Examiner
UNITED STATES PATENTS

| | | | |
|---|---|---|---|
| 1,165,859 | 12/1915 | Ebert. | |
| 1,577,952 | 3/1926 | Carnegie | 29—96 |
| 2,181,023 | 11/1939 | Moore | 29—96 |
| 3,200,473 | 8/1965 | Bader | 29—96 |
| 3,246,382 | 4/1966 | Zierden | 29—96 |

WILLIAM W. DYER, Jr., *Primary Examiner.*
HARRISON L. HINSON, *Examiner.*